United States Patent [19]

Shah

[11] Patent Number: 5,100,101

[45] Date of Patent: Mar. 31, 1992

[54] ELECTROMECHANICAL BIDIRECTIONAL ROTATION DEVICE

[76] Inventor: Reza H. Shah, 1176 Rutherford Road, Maple, Ontario, Canada, L6A 1S2

[21] Appl. No.: 678,003

[22] Filed: Apr. 1, 1991

[51] Int. Cl.⁵ .................... F16K 31/04; H02P 1/22
[52] U.S. Cl. .................... 251/129.11; 251/129.12; 318/293
[58] Field of Search .............. 251/129.11, 129.12; 318/293, 289, 290, 291

[56] References Cited
U.S. PATENT DOCUMENTS 2,912,632  11/1959  Turtil .................... 318/293 X
3,870,274  3/1975   Broe .................... 251/129.12

Primary Examiner—Arnold Rosenthal
Attorney, Agent, or Firm—David W. Wong

[57] ABSTRACT

The bidirectional rotation device comprises a direct current motor connected in series with a capacitor and a reversible switching means. When a direct current voltage is applied to the series-connected combination of direct current motor and capacitor through the switching means in one position, the charged capacitor causes the motor to rotate in one direction for a short period of time; and when the voltage is again applied to the combination in the reversed polarities, the reversely charged capacitor will cause the motor to rotate in the reverse direction.

5 Claims, 1 Drawing Sheet

ELECTROMECHANICAL BIDIRECTIONAL ROTATION DEVICE

BACKGROUND OF THE INVENTION

This invention relates to a bidirectional rotation device and more particularly relates to an electromechanical bidirectional rotation device applicable for controlling a variety of mechanical apparatuses.

In electromechanical control apparatuses, it is often required to control a mechanical componet such as a baffle, interlock or the like between two positions selectively and alternately. For example, in the conduction of a gaseous material from one location to another location, a baffle plate is provided in the conducting pipe so that the baffle can be pivoted to position either parallel to the longitudinal axis of the pipe to allow the gas to flow through the pipe or transverse to the longitudinal axis thus blocking the flow of gas through the pipe. An electromechanical system is commonly employed to provide the positioning of such baffle. The baffle is connected to a mechanical pivotting linkage outside of the pipe, and the linkage is coupled to an electromagnetic solenoid. The solenoid can be energized to push the linkage in a direction to position the baffle at the selected position accordingly. In such system, a biassing means such as a biassing spring must be provided to return the baffle to the first position when the solenoid is de-energized. It can be appreciated that the solenoid must be of such size that sufficient strength is generated therein to overcome the force of the biassing spring initially in order to pivot the baffle to the selected blocking position. Furthermore, in order to maintain the baffle in the blocking position, the solenoid must remain energized. Thus, it is not energy efficient to operate such system. Moreover, such solenoid system requires a relatively high voltage to operate. Therefore, it is not suitable for use, particularly, in a low voltage system. For a low voltage system, complex electrical control is usually required to provide sufficient torque to operate the mechanical component. Also, in such electromechanical arrangement, the mechanical linkage is often subject to breakdown after a relatively short period of time in use.

SUMMARY OF THE INVENTION

It is a principal object of the present invention to provide an electromechanical bidirectional rotation device which has relatively no mechanical wearing parts.

It is another object of the present invention to provide an electromechanical rotation device suitable for use in a low voltage system.

It is another object of the present invention to provide a baffling system for a gas conducting pipe having a high torque electromechanical control device for the baffle.

It is yet another object of the present invention to provide an electromechanical device which has low energy consumption.

It is still another object of the present invention to provide an electromechanical device which has relatively non-wearing parts and is simple in construction and can be incorporated in other control system easily.

DETAIL DESCRIPTION OF PREFERRED EMBODIMENTS

Figure 1:
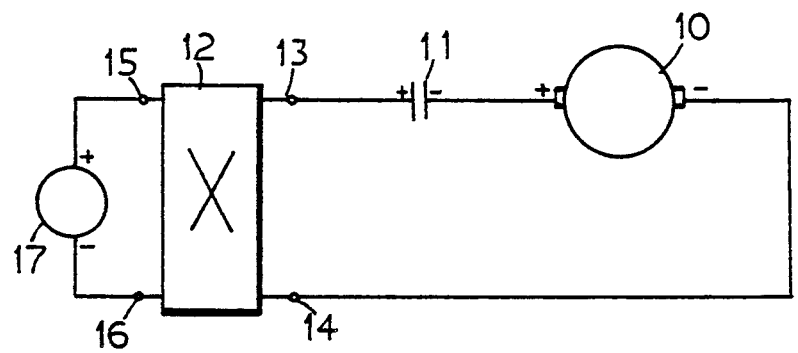
FIG. 1 is a schematic diagram of the electromechanical device according to the present invention.
Figure 2:
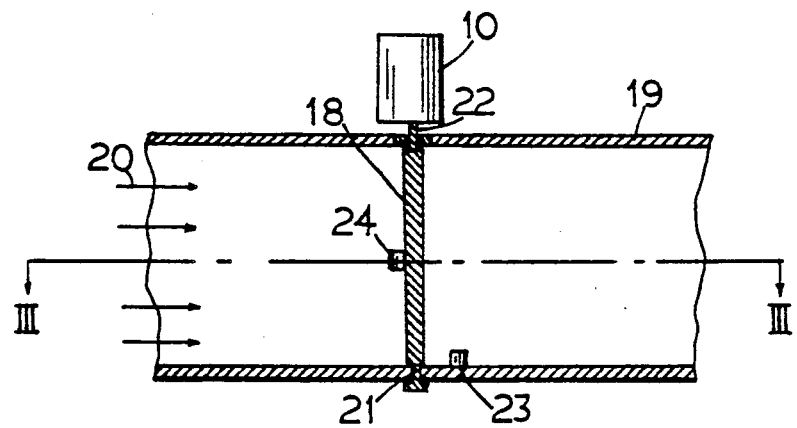
FIG. 2 is a partial sectional elevation of the electromechanical baffle device for a gas conducting pipe according to the present invention.
Figure 3:
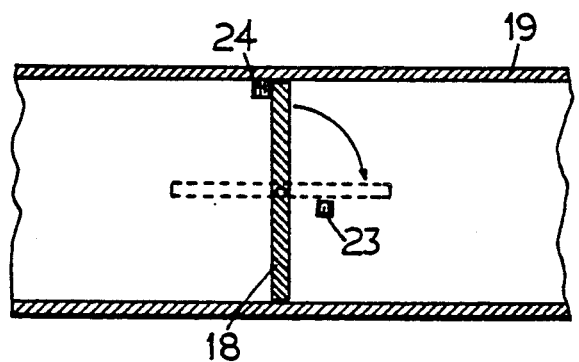
FIG. 3 is a top sectional elevation view along section line III—III of FIG. 2.

The present invention is illustrated in the accompanying figures wherein similar parts are indicated by the same reference numerals throughout the several views, and where pairs or parts are used the parts are referenced by prime of reference numeral.

In the drawings, the direct current (DC) motor 10 in the device of the present invention may be of a permanent magnet or electromagnetic type which is operative to rotate in one direction when the direct current voltage is applied to it in one polarity, and to rotate in a reverse direction when the voltage of a reverse polarity is applied thereto. A capacitor 11 is connected in series with the DC motor 10. The combination of the series-connected DC motor 10 and capacitor 11 is connected to a reversible switching means 12. The reversible switching means 12 may be a mechanical switch or an electronic switch of the same function. It may be a single pole double throw switch or double pole double throw switch having connection terminals 13 and 14, and supply terminal 15 and 16. The connection terminal 13 is connected to the positive terminal of the DC motor 10 through the capacitor 11 as shown, and the connection terminal 14 is connected to the negative terminal of the DC motor 10. The supply terminal 15 is connected to the positive polarity of a direct current voltage source 17 while the supply terminal 16 is connected to the negative polarity of the supply voltage source 17. In the case of a single pole double throw switch, the reversible switching means 12 has one single movable contact therein coupled to the connection terminal 13. The movable contact is operative to one position at which it connects the connection terminal 13 to the supply terminal 15, and to a second position wherein the movable contact connects the connection terminal 13 to the connection terminal 14. Supply terminal 16 and connection terminal 14 are commonly connected together. When the movable contact of the reversible switching means is at the first position the positive potential flows from the voltage source 17 through capacitor 11 to the motor 10, and the combination of capacitor 11 and motor 10 will act as a common capacitor-inductor circuit, so that the capacitor 11 will be charged to the positive potential as shown in FIG. 1. The charged capacitor 11 will then cause the motor 10 to rotate in one direction for a predetermined period of time until the charges in the capacitor 11 are expended. As soon as it is discharged, the capacitor 11 will again be charged by the voltage source 17 to the same potential. If at this time, the reversible switching means 12 is operated to the second position with the connection terminal 13 connected to the connection 14, the charges in the already fully charged capacitor 11 will then be applied in the reversed polarities to the motor 10, thus causing the motor 10 to rotate in the reversed direction for a short period of time until the capacitor 11 is completely discharged. If the reversible switching means 12 is then again operated to return to its first position, the original condition will prevail and the motor 10 will rotate again in the first direction as described above. In this manner, the motor 10 can be actuated to rotate in the opposite directions alternately.

In the case the reversible switching means 12 is a double throw double pole switch, it is operative selectively in one position in which the positive polarity of the voltage source 17 is applied to the positive terminal of the DC motor 10 through the capacitor 11 while the negative polarity of the voltage source 17 is connected through the supply terminal 16 and connection terminal 14 to the negative terminal of the DC motor 10; and in the second position, the negative polarity of the voltage source 17 is applied to the positive terminal of the DC motor 10 through the capacitor 11 while the positive polarity of the voltage source 17 is connected to the negative terminal of the DC motor 10. It can be appreciated by those skilled in the art that the capacitor 11 may be connected in series with the DC motor 10 on either the positive terminal side of the DC motor 10 as shown or at the negative terminal side therein. Also, the negative and positive terminals may be opposite to those shown in FIG. 1. Thus, the difference between the use of a single pole double throw switch and a double pole double throw switch is that in the first case the capacitor 11 will be charged at only one position of the reversible switching means, whereas it will be charged in both positions of the reversible switching means.

The electromechanical device of the present invention may be employed to provide the control of a varieties of mechanical components that require to be positioned in two alternate positions selectively. For example, the device may be incorporated in a gas conducting system having a baffle 18 rotatably located within a pipe 19 which is used to conduct a gaseous material or air flow 20 therethrough. The baffle 18 is mounted on a rotatable shaft 21 coupled to the rotary shaft 22 of the DC motor 10 as described above. The baffle 18 will rotate in one direction when the reversible switching means 12 is operated in one condition and it will rotate in the reverse direction when the reversible switching means 12 is operated in the second condition alternately and sequentially. When the baffle 18 is rotated in one direction it will be located in a position abutting the abutment pin 21 located in the inside surface of the pipe 19 such that the plane of the baffle 18 is parallel to the longitudinal axis of the pipe 19, thus allowing the gas to flow through the pipe 19. When the baffle 18 is rotated in the reverse direction by the operation of the reversible switching means 12 it will rotate in the reverse direction until it is maintained in the position transverse or perpendicular to the longitudinal axis of the pipe 19 by the shoulder pin 24. Thus, the baffle 18 blocks the pipe 19 to prevent the gas from flowing therethrough.

The magnitude of the torque applied to the baffle 18 as well as the period of its rotation are dependent upon the value of the capacitor 11. The larger the capacitance of the capacitor 11, the larger will be the torque and longer will be the rotation of the DC motor 10 maintained by the capacitor 11. Furthermore, due to the relatively high torque that can be developed by the present device with a low voltage direct current motor, the device lends itself for incorporation in a low voltage electrical system used for controlling the operation of mechanical components in which the mechanical operation of such components requires a relatively high torque.

While I have illustrated in the drawings and description above specific methods and apparatus constituting preferred embodiments of the invention, it will be appreciated that various modifications may be made in the form of the apparatus, and that equivalent methods, elements and mechanism may be substituted therefor without departing from the scope of the invention. All such changes, including reversals of parts and the use of certain features of the invention independently of other features, all fall within the spirit and scope of the invention as defined in the appended claims.

I claim:

1. An electromechanical bidirectional rotation device comprising,
   a direct current motor means having one input terminal and a second input terminal, said motor means being operative to rotate in a selected one direction by applying a direct current voltage thereto of one selected polarity and to rotate in a reverse direction opposite to said one direction by applying thereto said direct current voltage in a second polarity opposite to said one selected polarity,
   a capacitive means connected in series with said motor means through said one input terminal,
   a reversible switching means having a first connection terminal, a second connection terminal, a third connection terminal and a fourth connection terminal, said capacitive means and said motor means being connected in series with said first connection terminal, and said second connection terminal being connected to said second input terminal of said motor means, said third connection terminal being operative for connection to one polarity of a direct current voltage supply means and said fourth connection terminal being operative for connection to an opposite polarity of said direct current voltage supply means respectively, whereby said capacitive means is charged to a predetermined potential to cause said motor means to rotate for a predetermined period of time in one direction.

2. An electromechanical bidirectional rotation device according to claim 1 wherein said reversible switching means is a single pole double throw switching means having a movable contact therein connected to said first connection terminal, first fixed contact connected to said third connection terminal, and a second fixed contact connected to both said second connection terminal and said fourth connection terminal, said movable contact being operative to locate at one position wherein said first connection terminal is connected to said third connection terminal whereby said motor means rotates in one direction for a predetermined period of time, and following said first position to locate selectively at a second position wherein said first connection terminal is connected to said second connection terminal whereby said motor means rotates in a reverse direction.

3. In a gas conduction pipe system wherein the gas flowing through said pipe is controlled by an electromechanical device comprising,
   a baffle plate means rotatably mounted within said pipe and having a rotatable shaft extending outside of said pipe,
   a direct current motor means coupled to said pipe,
   a reversible switching means having one connection terminal, a second connection terminal, a third connection terminal and a fourth connection terminal, said reversible switching means being operative selectively in one condition wherein said one connection terminal is connected to said third connection terminal while said second connection terminal is connected to said fourth connection terminal, and in a second condition wherein said one connection terminal is connected to said fourth connection terminal while said second connection terminal is connected to said third connection terminal, a capacitive means connected in series with said motor means and said one connection terminal of said reversible switching means, said motor means having a second input terminal connected to said second connection terminal of said reversible switching means, a direct current voltage supply means having one polarity operative for connecting to said third connection terminal of said reversible switching means, and a reverse polarity operative for connecting to said fourth connection terminal of said reversible switching means, a first abutment means located within said pipe and operative to abut said baffle plate means when said baffle plate means is rotated to a transverse position perpendicular to the longitudinal axis of the pipe, a second abutment means located within said pipe and operative to abut said baffle plate means when said baffle plate means is rotated to a second position substantially parallel to the longitudinal axis of the pipe.

4. An electromechanical device according to claim 3 wherein said motor means is a low voltage permanent magnet motor.

5. An electromechanical device according to claim 4 wherein said motor means is mounted on said pipe and having a rotary shaft therein coupled to said rotatable shaft of said baffle plate means.

* * * * *